US012362079B2

(12) United States Patent
Kuester et al.

(10) Patent No.: US 12,362,079 B2
(45) Date of Patent: Jul. 15, 2025

(54) METHOD FOR MANUFACTURING AN ELECTRICALLY CONDUCTIVE COMPOSITE

(71) Applicant: ÉCOLE DE TECHNOLOGIE SUPÉRIEURE, Montreal (CA)

(72) Inventors: Scheyla Kuester, Montréal (CA); Nicole Demarquette, Montréal (CA)

(73) Assignee: ÉCOLE DE TECHNOLOGIE SUPÉRIEURE, Montreal (CA)

( * ) Notice: Subject to any disclaimer, the term of this patent is extended or adjusted under 35 U.S.C. 154(b) by 0 days.

(21) Appl. No.: 18/257,386

(22) PCT Filed: Dec. 17, 2021

(86) PCT No.: PCT/CA2021/051839
§ 371 (c)(1),
(2) Date: Jun. 14, 2023

(87) PCT Pub. No.: WO2022/126281
PCT Pub. Date: Jun. 23, 2022

(65) Prior Publication Data
US 2024/0321477 A1 Sep. 26, 2024

Related U.S. Application Data

(60) Provisional application No. 63/199,294, filed on Dec. 18, 2020.

(51) Int. Cl.
*H01B 1/22* (2006.01)
*H01B 1/24* (2006.01)
*H01B 13/00* (2006.01)

(52) U.S. Cl.
CPC ................. *H01B 1/22* (2013.01); *H01B 1/24* (2013.01); *H01B 13/0016* (2013.01); *H01B 13/0036* (2013.01)

(58) Field of Classification Search
CPC ........... H01B 1/22; H01B 1/24; H01B 13/006
(Continued)

(56) References Cited

U.S. PATENT DOCUMENTS 2,027,962 A 1/1936 Currie
3,086,242 A 4/1963 Cook
(Continued)

FOREIGN PATENT DOCUMENTS

BR 102012007746 A2 11/2017
CN 1900162 A 1/2007
(Continued)

OTHER PUBLICATIONS

Alig, I., et al., Establishment, morphology and properties of carbon nanotube networks in polymer melts, Polymer, 2012, 53(1): p. 4-28.
(Continued)

*Primary Examiner* — Tri V Nguyen
(74) *Attorney, Agent, or Firm* — Lavery, de Billy, L.L.P.; Isabelle Pelletier

(57) ABSTRACT

A method of manufacturing an electrically conductive composite comprising a thermoplastic polymer and electrically conductive particles embedded in at least part of the surface of the thermoplastic polymer is provided. This method comprises the steps of: a) providing a heat-shrinkable object made of bulk thermoplastic polymer, wherein at least part of the surface of the object is rough, b) depositing electrically conductive particles on said part of the surface of the object that is rough leaving spaces free of particles on said part of the surface of the object that is rough, and c) heating the object above a shrinking temperature, thereby shrinking the object, embedding the particles into said part of the surface of the object that is rough and allowing the particles to form conductive paths yielding the electrically conductive composite.

18 Claims, 1 Drawing Sheet

(58) Field of Classification Search
USPC ................................ 252/502, 510, 511, 512
See application file for complete search history.

(56) References Cited

U.S. PATENT DOCUMENTS

| | | | |
|---|---|---|---|
| 3,576,387 A | 4/1971 | Derby | |
| 4,265,789 A | 5/1981 | Christopherson et al. | |
| 4,542,076 A | 9/1985 | Bednarz et al. | |
| 4,764,422 A | 8/1988 | Hill et al. | |
| 5,288,854 A | 2/1994 | Diamond et al. | |
| 6,127,474 A | 10/2000 | Andelman | |
| 6,881,904 B2 | 4/2005 | Millas et al. | |
| 7,931,958 B2 | 4/2011 | Arai et al. | |
| 8,691,393 B2 | 4/2014 | Cook et al. | |
| 9,111,658 B2 | 8/2015 | Shah et al. | |
| 10,721,815 B2 | 7/2020 | Grosse et al. | |
| 2002/0037376 A1 | 3/2002 | Fenton | |
| 2011/0281070 A1* | 11/2011 | Mittal | B05D 1/005 428/221 |
| 2012/0320558 A1 | 12/2012 | Foster et al. | |
| 2013/0130049 A1 | 5/2013 | Moilanen | |
| 2015/0044383 A1 | 2/2015 | Kim | |
| 2015/0057386 A1 | 2/2015 | Salem Alhassan Alkhazraji et al. | |
| 2015/0267030 A1 | 9/2015 | Nosker et al. | |
| 2017/0149151 A1 | 5/2017 | Allais et al. | |
| 2018/0297340 A1 | 10/2018 | Lima et al. | |
| 2020/0015349 A1* | 1/2020 | Grosse | H05K 1/0313 |

FOREIGN PATENT DOCUMENTS

| | | |
|---|---|---|
| CN | 103060779 A | 4/2013 |
| CN | 103762457 A | 4/2014 |
| CN | 104151833 A | 11/2014 |
| CN | 104448837 A | 3/2015 |
| CN | 104558777 A | 4/2015 |
| CN | 106413367 A | 2/2017 |
| CN | 106810875 A | 6/2017 |
| CN | 106832522 A | 6/2017 |
| CN | 107236302 A | 10/2017 |
| CN | 107415420 A | 12/2017 |
| CN | 107742560 A | 2/2018 |
| CN | 109251402 A | 1/2019 |
| CN | 109370078 A | 2/2019 |
| DE | 3034747 A1 | 4/1982 |
| JP | 63280603 A | 11/1988 |
| JP | 2002322388 A | 11/2002 |
| MX | 2013006078 A | 12/2014 |
| WO | 2007/096479 A1 | 8/2007 |
| WO | 2013011250 A1 | 1/2013 |
| WO | 2017/185186 A1 | 11/2017 |

OTHER PUBLICATIONS

Al-Saleh, M.H. and Sundararaj, U., Electromagnetic Interference (EMI) Shielding Effectiveness of PP/PS Polymer Blends Containing High Structure Carbon Black, Macromolecular Materials and Engineering, 2008, 293(9): p. 789.

Arjmand, M., et al., Comparative study of electromagnetic interference shielding properties of injection molded versus compression molded multi-walled carbon nanotube/polystyrene composites, Carbon, 2012, 50(14): p. 5126-5134.

Bhattacharyya, A.R., et al., Melt Mixing as Method to Disperse Carbon Nanotubes into Thermoplastic Polymers, Fullerenes, Nanotubes and Carbon Nanostructures, 2005, 13(supl): p. 211-224.

Chen, H., et al., Thermal conductivity of polymer-based composites: Fundamentals and applications, Progress in Polymer Science, 2016, 59: p. 41-85.

Choudhary, V. and Gupta, A., Polymer/Carbon Nanotube Nanocomposites, Carbon Nanotubes—Polymer Nanocomposites, 2011: InTech. 396.

Chung, D.D.L., Carbon materials for structural self-sensing, electromagnetic shielding and thermal interfacing, Carbon, 2012, 50(9): p. 3342-3353.

Chung, D.D.L., Electromagnetic interference shielding effectiveness of carbon materials, Carbon, 2001, 39(2): p. 279-285.

Emplit, A., et al., Polypropylene Carbon Nanotubes Nanocomposites: Combined Influence of Block Copolymer Compatibilizer and Melt Annealing on Electrical Properties, Journal of Nanomaterials, 2017, vol. 2017: p. 1-11.

Gao, Y., Graphene and Polymer Composites for Supercapacitor Applications: a Review, Nanoscale Research Letters, 2017. 12(1):387, p. 1-17.

Greco, F et al., Micro and Nanowrinkled Conductive Polymer Surfaces on Shape-memory Polymer Substrates: Tuning of Surface Microfeatures Towards Smart Biointerfaces, MRS Proceedings, 1411, Mrsf11-1411-ee09-21. doi:10.1557/opl.2012.

Heaney, M. B., The Measurement, Instrumentation and Sensors Handbook, CRC Press, 1999.

Helal, E., et al., Styrenic block copolymer-based nanocomposites: Implications of nanostructuration and nanofiller tailored dispersion on the dielectric properties, Polymer, 2015. 64: p. 139-152.

Kuester, S. et al., Morphology, mechanical properties and electromagnetic shielding effectiveness of poly(styrene-b-ethylene-ran-butylene-b-styrene)/carbon nanotube nanocomposites: effects of maleic anhydride, carbon nanotube loading and processing method, Polymer International, 2018, 67(9): p. 1229-1240.

Kuester, S., et al., Processing and characterization of conductive composites based on poly(styrene-b-ethylene-ran-butylene-b-styrene) (SEBS) and carbon additives: A comparative study of expanded graphite and carbon black, Composites Part B, 2016, 84: p. 236-247.

Kuester, S., et al., Electromagnetic interference shielding and electrical properties of nanocomposites based on poly(styrene-b-ethylene-ran-butylene-b-styrene) and carbon nanotubes, European Polymer Journal, 2016, 77: p. 43-53.

Kurusu, R.S., et al., The Role of Selectively Located Commercial Graphene Nanoplatelets in the Electrical Properties, Morphology, and Stability of EVA/LLDPE Blends, Macromolecular Materials and Engineering, 2018, 303(9): p. 1800187 (1 of 9).

Mathur, R.B., et al., Electrical and mechanical properties of multi-walled carbon nanotubes reinforced PMMA and PS composites, Polymer Composites, 2008, 29(7): p. 717-727.

Pande, S., et al., Mechanical and electrical properties of multiwall carbon nanotube/polycarbonate composites for electrostatic discharge and electromagnetic interference shielding applications, RSC Advances, 2014, 4(27): p. 13839-13849.

Panwar, V. and R.M. Mehra, Analysis of electrical, dielectric, and electromagnetic interference shielding behavior of graphite filled high density polyethylene composites, Polymer Engineering & Science, 2008, 48(11): p. 2178-2187.

Pillet, G. et al., Embedded carbon nanotubes on surface of thermoplastic poly(ether ether ketone), Polymer, vol. 226, 2021, 123807, ISSN 0032-3861, https://doi.org/10.1016/j.polymer.2021.123807.

Sawai, P. and Banerjee, S., Electromagnetic interference shielding effectiveness of graphite-filled polypropylene and poly(ether imide) based composites, Journal of Applied Polymer Science, 2008, 109(3): p. 2054-2063.

Stoeffler, K., et al., Polyamide 12 (PA12)/Clay nanocomposites fabricated by conventional extrusion and water-assisted extrusion processes, Journal of Applied Polymer Science, 2013, 130(3): p. 1959-1974.

Thomassin, J.-M., et al., Polymer/carbon based composites as electromagnetic interference (EMI) shielding materials, Materials Science and Engineering: R: Reports, 2013, 74(7): p. 211-232.

Tong, X.C., Advanced Materials and Design for Electromagnetoc Interference Shielding, 2009: CRC Press.

Yan, D.-X., et al., Efficient electromagnetic interference shielding of lightweight graphene/polystyrene composite, Journal of Materials Chemistry, 2012, 22(36): p. 18772-18774.

Yang, Y., et al., A Comparative Study of EMI Shielding Properties of Carbon Nanofiber and Multi-Walled Carbon Nanotube Filled Polymer Composites, Journal of Nanoscience and Nanotechnology, 2005, 5(6): p. 927-931.

(56) References Cited

OTHER PUBLICATIONS

Yang, Y., et al., Novel Carbon Nanotube—Polystyrene Foam Composites for Electromagnetic Interference Shielding. Nano Letters, 2005, 5(11): p. 2131-2134.

* cited by examiner

METHOD FOR MANUFACTURING AN ELECTRICALLY CONDUCTIVE COMPOSITE

CROSS-REFERENCE TO RELATED APPLICATIONS

This application is a National Entry Application of PCT application no PCT/CA2021/051839 filed on Dec. 17, 2021 and published in English under PCT Article 21(2), which itself claims benefit, under 35 U.S.C. § 119 (e), of U.S. provisional application Ser. No. 63/199,294, filed on Dec. 18, 2020. All documents above are incorporated herein in their entirety by reference.

FIELD OF THE INVENTION

The present invention relates to a method of manufacturing an electrically conductive composite. More specifically, the present invention is concerned with the manufacture of a composite comprising a thermoplastic polymer and electrically conductive particles embedded in at least part of the surface of the thermoplastic polymer.

BACKGROUND OF THE INVENTION

Over the past three decades, the industrial and scientific world has shown a keen interest in electrically and thermally conductive polymer composites. These materials have the advantage, when compared to metallic materials, of being much lighter and also much more flexible. Even if their electrical conductivity is of the order of $10^{-1}$ to 1 S/m (which is relatively low when compared to the conductivity of pure metals such as copper 6 $10^{7}$ S/m), they can be used for many applications such as supercapacitors, sensors, materials to protect against electrostatic charges, or as materials for electromagnetic shielding.

In particular, electromagnetic shielding materials are mainly used in the medical, aerospace and defense, automotive, electronics and telecommunications sectors to protect devices from electromagnetic interference. For example, a phone or laptop generates electromagnetic interference due to the emission of electromagnetic waves in the GHz frequency range. The energy radiated by these waves can interfere with remote control, radio antenna and other signals. For such applications the materials must have a shielding efficiency of at least 20 dB.

Composites formed from polymers and conductive particles are conventionally obtained by hot mixing in an extruder or internal mixer. Even if these processes are relatively simple, the performances of the obtained materials depend on the good dispersion of the conductive particles within the polymer.

The conductive particles can be micrometric or nanometric. In the case of micrometric particles, it is necessary to add a large quantity of particles to the polymers which makes shaping the composites difficult and also has a deleterious effect on the composite properties. For nanometric particles (like graphene, carbon nanotubes, silver or copper nanowires, or even conductive polymers), the process parameters must be tightly controlled so that the particles are adequately dispersed. This is not easy because of the strong cohesion existing between the conductive particles as well as the high viscosity of molten polymers. In fact, adequate dispersion is seldom obtained. It is therefore often necessary to add a large quantity of particles to obtain the desired electrical conductivity. This also can have a deleterious effect on the composite properties. Lastly, this considerably increases the composite price as well.

Several methods have been suggested to improve the dispersion of nanoparticles within thermoplastics. These include:

- chemical modification of the nanoparticles or the polymers to improve their chemical compatibility,
- the use of a masterbatch, which is a concentrated "suspension" of nanoparticles within the polymer obtained by solution or by hot mixing, followed by dilution of the masterbatch within the matrix by conventional plastics processing,
- complex processes (such as water-assisted extrusion methods) that require many steps to obtain good quality materials, but which make scale-up difficult and/or too expensive,
- the use of block copolymer to control the location of the nanoparticles, and
- the use of polymer blends.

SUMMARY OF THE INVENTION

In accordance with the present invention, there is provided:

1. A method of manufacturing an electrically conductive composite comprising a thermoplastic polymer and electrically conductive particles embedded in at least part of the surface of the thermoplastic polymer, the method comprising the steps of:
   a) providing a heat-shrinkable object made of bulk thermoplastic polymer, wherein at least part of the surface of the object is rough,
   b) depositing electrically conductive particles on said part of the surface of the object that is rough leaving spaces free of particles on said part of the surface of the object that is rough, and
   c) heating the object above a shrinking temperature, thereby shrinking the object, embedding the particles into said part of the surface of the object that is rough and allowing the particles to form conductive paths yielding the electrically conductive composite.

2. The method of item 1, wherein the heat-shrinkable object is made of an oriented amorphous or crystalline thermoplastic; preferably a polyolefin such as polyethylene or polypropylene; polystyrene; a polyvinyl such as polyvinyl chloride or polyvinyl acetate; a fluoropolymer such as polytetrafluoroethylene; a polyamide; a polyester such as polyethylene terephthalate; a polyurethane, a thermoplastic elastomer, or a copolymer or a blend thereof; and more preferably polystyrene.

3. The method of item 1 or 2, wherein the heat-shrinkable object is shaped as a film.

4. The method of item 3, wherein the film is between about 100 μm and about 500 μm in thickness.

5. The method of any one of items 1 to 4, wherein the heat-shrinkable object is a shrinkable polystyrene sheet.

6. The method of any one of items 1 to 5, wherein step a) comprises:
   i. applying stress on a heated thermoplastic polymer object to stretch the thermoplastic polymer object and
   ii. cooling the thermoplastic polymer object while the thermoplastic polymer object is still under stress and/or quenching the thermoplastic polymer object, preferably within less than 30 seconds, more preferably less than 15 seconds, yet more preferably less than 10 seconds, and most preferably less than 5 seconds.

7. The method of any one of items 1 to 6, wherein step a) comprises:

0. hot extrusion of a thermoplastic polymer into a thermoplastic polymer object,
i. applying stress on the thermoplastic polymer object while the thermoplastic polymer object is still hot to stretch the thermoplastic polymer object and
ii. cooling the thermoplastic polymer object while the thermoplastic polymer object still under stress.

8. The method of item 6 or 7, wherein the thermoplastic polymer object is heated at a temperature above the glass transition temperature of the thermoplastic polymer in step i.

9. The method of any one of items 6 to 8, wherein the thermoplastic polymer object is cooled at a temperature below the glass transition temperature of the thermoplastic polymer in step ii., preferably at a temperature at least about 50° C. below the glass transition temperature of the thermoplastic polymer.

10. The method of any one of items 1 to 9, wherein the shrinking temperature is at or above the glass transition temperature of the thermoplastic polymer, preferably about 70° C. or more above the glass transition temperature of the thermoplastic polymer, and more preferably between about 95° C. and about 225° C.

11. The method of any one of items 1 to 10, wherein step a) comprises sanding part of the surface of the heat-shrinkable object, so that said part of the surface is rough.

12. The method of any one of items 1 to 11, wherein the electrically conductive particles are particles of silver, copper, nickel, zinc, cobalt, tin, lead, platinum, gold, or an alloy or a mixture thereof, or particles of a carbon allotrope, preferably graphite particles (preferably flakes), graphene particles (preferably flakes), carbon nanotubes, silver particles (e.g. silver nanowires), copper particles (e.g., copper nanowires), carbon black, carbon fibers, carbon nanofibers, or chemically modified graphene (preferably flakes), more preferably graphite particles (preferably flakes), graphene particles (preferably flakes), silver particles, copper particles, or carbon black, and most preferably graphite particles (preferably flakes).

13. The method of any one of items 1 to 12, wherein the electrically conductive particles are nanoparticles between about 1 and about 1000 nm in size or microparticles between about 1 and 1000 μm in size, preferably the electrically conductive particles are up to 500 μm in size, and most preferably the electrically conductive particles are up to 250 μm in size.

14. The method of any one of items 1 to 13, wherein the electrically conductive particles are of any shape, preferably irregular, spheroidal, spherical in shape or in the form of flakes, and more preferably in the form of flakes.

15. The method of any one of items 1 to 14, wherein the electrically conductive particles that are irregular, spheroidal or spherical in shape have a sphericity of 0.78 of more, and preferably 0.87 or more.

16. The method of any one of items 1 to 15, wherein, in step b), the electrically conductive particles are deposited randomly on said part of the surface of the object that is rough.

17. The method of any one of items 1 to 16, wherein step b) comprises rubbing an exfoliate-able object made of a conducting material on said part of the surface of the heat-shrinkable object that is rough, thereby depositing the electrically conductive particles thereon.

18. The method of any one of items 1 to 17, wherein step b) comprises rubbing an exfoliate-able object, preferably the graphite tip of a graphite pencil, over said part of the surface of the heat-shrinkable object that is rough, thereby exfoliating and depositing graphite onto the surface.

19. The method of any one of items 1 to 16, wherein, in step b), wherein the electrically conductive particles in loose powder form are placed on said part of the surface of the heat-shrinkable object that is rough.

20. The method of item 19, wherein, in step b), wherein the electrically conductive particles are further rubbed on said part of the surface of the heat-shrinkable object that is rough.

21. The method of any one of items 1 to 20, further comprising the step d) of stacking on top of one another two or more electrically conductive composites produced according to steps a) to c), applying pressure on the stack of electrically conductive composites, and heating the stack of electrically conductive composites under pressure to fuse the two or more electrically conductive composites together.

22. An electrically conductive composite produced according to method of any one of items 1 to 21.

DETAILED DESCRIPTION OF THE INVENTION

Figure 1:
FIG. 1 shows a shrinkable object.

Turning now to the invention in more details, there is provided a method of manufacturing an electrically conductive composite comprising a thermoplastic polymer and electrically conductive particles embedded in at least part of the surface of the thermoplastic polymer, the method comprising the steps of:

a) providing a heat-shrinkable object made of bulk thermoplastic polymer, wherein at least part of the surface of the object is rough,
b) depositing electrically conductive particles on said part of the surface of the object that is rough leaving spaces free of particles on said part of the surface of the object that is rough, and
c) heating the object above a shrinking temperature, thereby shrinking the object, embedding the particles into said part of the surface of the object that is rough and allowing the particles to form conductive paths yielding the electrically conductive composite.

In another aspect, there is provided an electrically conductive composite comprising a thermoplastic polymer and electrically conductive particles embedded in at least part of the surface of the thermoplastic polymer, which is preferably produced according to the above method.

The present invention takes advantage of the fact that, when the object shrinks, the particles become embedded within its rough surface. Indeed, the rough surface exhibits pits, peaks, grooves and the like in which the particles can sit at step b). Then, during shrinking at step c), the particles become embedded within the resulting composite. This means that, after step c), these particles are located inside the composite rather than sitting on its surface as in step b).

It is an advantage of the invention that the particles do not need to be embedded in the object (for example by sandwiching them between two polymer layers/films) before the object is heated and shrunk. In the invention, the particles only need to be deposited on the surface of the object and they become embedded during the heating step. Therefore, in preferred embodiments, the electrically conductive particles are unattached to said part of the surface of the object that is rough.

In embodiments, the particles are located within the composite down to a depth ranging from about 10 μm to about 200 μm from the rough surface of the object (which has become the composite) where the particles were originally deposited in step b).

Also, as the object shrinks, the particles are drawn closer together. Since these particles are electrically conductive, conducting paths between the particles are formed and the object itself become conductive. By contrast, before shrinking, there are spaces free of particles on the surface of the object. This means that the particles are not forming a cohesive or continuous layer. The particles are rather spread on the surface, spaced apart individually and/or in patches, clumps or aggregates separated by spaces free of particles. As a result, before shrinking, the object is preferably electrically non-conductive and it is only after shrinking, when the particles sufficiently touch each other to form conducting paths that the resulting composite becomes electrically conductive.

Figure 2:
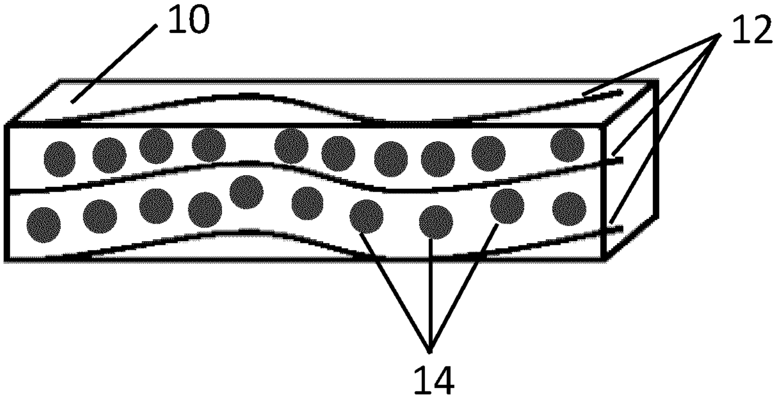
FIG. 2 shows the shrinkable object with particles deposited on one of its surfaces.
Figure 3:
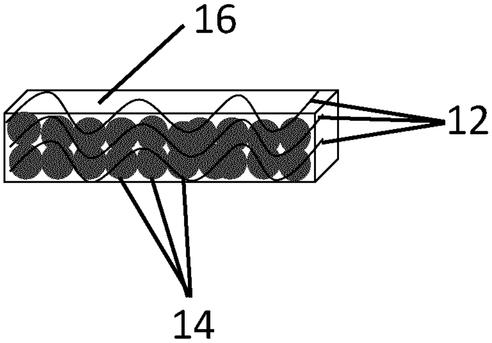
FIG. 3 shows the object of FIG. 2 after it has shrunk.

A schematic representation of this process of provided in FIGS. 1 to 3. FIG. 1 shows a heat-shrinkable object (10) made of bulk thermoplastic polymer. The polymer chains (12) within the bulk thermoplastic polymer are shown. FIG. 2 shows the shrinkable object with loose electrically conductive particles (14) deposited on one of its surfaces (the surface facing the viewer in this case). FIG. 3 shows the object of FIG. 2 after it has shrunk. In the shrunk object, i.e. the electrically conductive composite (16), both the polymer chains (12) and the particles (14) have been drawn closer together and the particles (14) are now embedded, touching each other, at the surface of the shrunk object (16).

It will be clear from the above that the method of the invention thus allows to produce an electrically conductive composite that comprises a bulk thermoplastic polymer object and electrically conductive particles embedded in at least part of the surface of the thermoplastic polymer (i.e. the rough surface on which the electrically conductive particles have been deposited at step b) of the method). This surface, because of the embedded particles touching and forming conducting paths, is electrically conductive, thus yielding an electrically conductive composite.

It will be apparent to the skilled person that, in this electrically conductive composite, the particles do not form a separate layer on the bulk thermoplastic polymer, rather they become embedded within the polymer or, in other words, they are contained with the polymer; they become an integral part of the polymer (down to a certain depth as noted above).

Finally, it will be apparent to the skilled person that the electrically conductive composite produced is not shrinkable. Indeed, after step c, the thermoplastic polymer has been shrunk and is no longer shrinkable.

Step a) of the above method is to provide a heat-shrinkable object made of bulk thermoplastic polymer, wherein at least part of the surface of the object is rough.

Herein, "bulk thermoplastic polymer" means that the thermoplastic polymer is in the form of a solid mass. In words, the thermoplastic polymer is not in the from of fibers (woven or non-woven), or a foam (although it could show some limited porosity). For example, less than about 15%, preferably less than about 10% and more preferably less than about 5% porosity.

The heat-shrinkable object can be made of any heat-shrinkable thermoplastic polymer. These polymers include, but are not limited to oriented amorphous and crystalline thermoplastics including polyolefins such as polyethylene and polypropylene; polystyrene; polyvinyls such as polyvinyl chloride and polyvinyl acetate; fluoropolymers such as polytetrafluoroethylene; polyamides; polyesters such as polyethylene terephthalate; polyurethanes, thermoplastic elastomers, and copolymers and blends thereof. In preferred embodiments, the thermoplastic polymer is polystyrene.

The heat-shrinkable object can be a commercially available object such as the shrinkable polystyrene sheets sold under the brand names Shrinky Dinks® (Shrinky Dinks, USA) and Shrink Film® (Grafix, USA).

Alternatively, the heat-shrinkable object can be provided in step a) using methods well known in the art. Indeed, it is well known that when a thermoplastic polymer is heated and stretched, it may adopt a non equilibrium extended shape if cooled sufficiently rapidly and/or cooled while still under stress. Once this non equilibrium extended shape is heated, the polymer will recoil and the object will shrink. Examples of heat shrinkable materials may be found in U.S. Pat. Nos. 2,027,962 and 3,086,242, both of which are incorporated herein by reference.

In preferred embodiments, the heat-shrinkable object can be prepared by applying stress on a heated thermoplastic polymer object to stretch the thermoplastic polymer object and cooling the stretched thermoplastic polymer object while the thermoplastic polymer object is still under stress and/or quenching the thermoplastic polymer object (e.g. cooling within less than 30 seconds, more preferably less than 15 seconds, yet more preferably less than 10 seconds, and most preferably less than 5 seconds). The resulting polymer object is not in its equilibrium conformation. Therefore, when heated to its shrinking temperature or above, it will contract. The contraction rate depends on how much the polymer was stretched to begin with.

In preferred embodiments, the shrinkable object is prepared by hot extrusion of a thermoplastic polymer into a object, applying stress to the object while it is still hot to stretch the polymer object and cooling the stretched polymer object while it is still under stress.

Typically, to produce the heat-shrinkable object, the thermoplastic polymer object is heated at a temperature at or above its glass transition temperature before stretching and then cooled at a temperature below its glass transition temperature (preferably at a temperature at least about 50° C. below its glass transition temperature).

The shrinking temperature of the heat-shrinkable object is typically at or above the glass transition temperature of the thermoplastic polymer in the object, preferably about 70° C. or more above said glass transition temperature. In embodiments, the shrinking temperature is between about 95° C. and about 225° C.

The physical dimensions and overall shape of the heat-shrinkable object are not particularly limited and will depend on its final end use.

In preferred embodiments, the heat-shrinkable object is shaped as a film. In preferred embodiments, the film is between about 100 μm and about 500 μm in thickness (before shrinking).

As noted above, at least part of the surface of the heat-shrinkable object is rough. This rough surface can be prepared by sanding this particular part of the surface of the object. Any means known to the skilled person can be used for this purpose. In embodiments, the surface of the polymer object can be sanded, e.g. manually, using sandpaper or by any known industrial means. After sanding, the polymer object is preferably dusted to remove any loose thermoplastic polymer material.

The electrically conductive particles can be any electrically conductive particles useful in thermoplastic polymer composites. The particles can be nanoparticles or microparticles. Herein, "nanoparticles" are particles that are between about 1 and about 1000 nm in size and "microparticles" are particles that are between about 1 and 1000 μm in size. In preferred embodiments, the particles are up to 500 μm in size, and more preferably up to 250 μm in size.

The particles can be of any shape: irregular, spheroidal, wires, fibers, sheets, tubes, etc. In embodiments, the particles are irregular, spheroidal, or spherical in shape and more preferably spheroidal or spherical.

In preferred embodiments, the particles have a sphericity of 0.78 of more, and preferably 0.87 or more. Sphericity is a measure of how closely the shape of an object resembles that of a perfect sphere. The sphericity, Ψ, of a given particle is the ratio of the surface area of a sphere with the same volume as the particle to the surface area of the particle:

$$\Psi = \frac{\pi^{\frac{1}{3}}(6V_p)^{\frac{2}{3}}}{A_p}$$

where $V_p$ is volume of the particle and $A_p$ is the surface area of the particle. The sphericity of a sphere is 1 by definition, while any particle which is not a sphere has sphericity less than 1. For example, a cylinder with a length equals to 3 times its diameter has as sphericity of 0.78, while a cylinder with a length equals to its diameter has as sphericity of 0.87.

The electrically conductive particles can be made of metal or non-metal. Mixtures of the metallic particles and non-metallic particles are also appropriate. The metals can be, but are not limited to, silver, copper, nickel, zinc, cobalt, tin, lead, platinum, gold, and alloys and mixtures thereof. Appropriate non-metal particles can be, but are not limited to, particles of a carbon allotrope or a mixture thereof.

Allotropy or allotropism is the property of some chemical elements to exist in two or more different forms, in the same physical state, known as allotropes of the elements. Carbon allotropes are well known and include for example:

- amorphous carbon,
- graphite,
- graphene,
- fullerenes,
- carbon nanotubes,
- carbon nanobuds (allotrope of carbon in which fullerene like "buds" are covalently attached to the outer sidewalls of the carbon nanotubes),
- carbon nanorods (carbon-based one-dimensional rod like nanomaterials with diameters in the range of about 5 nanometers to about 100 nanometers and length to diameter aspect ratio of about 3 to 50),
- carbon nanofibers (fibers about 5-500 nanometers in diameter with an atomic structure similar to that of graphite),
- carbon fibers (fibers about 5-200 microns in diameter with an atomic structure similar to that of graphite)
- carbon nanosphere (carbon based nanospheres with a diameter in the range of about 5-500 nanometers, which are often porous), and
- carbon black,
- activated carbon, all of which optionally doped with one or more heteroatoms (preferably undoped). Preferred carbon allotropes include graphite (preferably flakes), graphene (preferably flakes), carbon nanotubes, carbon black, carbon fibers, carbon nanofibers, and chemically modified graphene (preferably flakes) . Most preferred carbon allotropes include graphite graphene (preferably flakes) and carbon black.

In preferred embodiments, the particles are graphite particles (preferably flakes), graphene (preferably flakes), carbon nanotubes, silver particles (e.g. silver nanowires), copper particles (e.g., copper nanowires), carbon black, carbon fibers, carbon nanofibers, or chemically modified graphene (preferably flakes). In more preferred embodiments, the particles are graphite particles (preferably flakes), graphene particles (preferably flakes), silver particles, copper particles, or carbon black. In most preferred embodiments, the particles are graphite particles (preferably flakes).

As noted above, in step b), electrically conductive particles are deposited on the rough surface of the object. This can be achieved in various ways.

In embodiments, the particles in loose powder form are placed on the rough surface. In further embodiments, this loose powder can be rubbed on the rough surface.

In other embodiments, the particles are deposited by rubbing an exfoliate-able object made of a conducting material on the rough surface. In specific embodiments where the particles are graphite particles, the particles are preferably deposited by rubbing an exfoliate-able graphite object, e.g. the graphite tip of a graphite pencil, over the rough surface, thereby exfoliating and depositing the graphite onto the surface. Any type of exfoliate-able graphite object can be used. Any type of graphite pencil can be used, including the B (soft), HB (medium), H (hard), and F (fine point) type pencils.

The particles are deposited on the rough surface in no particular order or pattern. In other words, the particles are deposited randomly on the rough surface. It is an advantage of the invention to avoid the need to dispose microstructures, e.g., fibers or wires, side-by-side, in a grid pattern, or any other ordered pattern. The method of the invention is much faster and easier to implement than other method requiring the ordered placement of microstructures and the like. Also, the method of the invention can easily produce an electrically conductive composite from nanoparticles, which are more difficult to order on a surface.

In embodiments, the method of the invention further comprises the step d) of stacking on top of one another two or more electrically conductive composites produced according to steps a) to c), applying pressure on the stack of electrically conductive composites, and heating the stack of electrically conductive composites under pressure to fuse the two or more electrically conductive composites together.

Advantages of the Method of the Invention

The method of the present invention achieves a satisfactory dispersion of conductive particles in a much simpler manner than when using extrusion or other conventional polymer processing methods (such as those mentioned in the table presented in the Example below). In particular, no chemical modification of the polymer or the particles was needed.

In addition, the quantity of particles necessary to achieve a certain level of conductivity is much lower compared to that required when using extrusion and other conventional polymer processing methods. For example, in the Examples below, by using only 2% graphite in the method of the invention, it was possible to produce electromagnetic shielding equivalent to that obtained using 20% or more of graphite in conventional methods. In consequence, the cost of the composite is reduced and the deleterious effect of using a high concentration of nanoparticles is avoided.

Conversely, the method of the invention makes it economically easier to use costlier particles (since a lesser quantity of particles is used). In fact, it is expected that, when using such costlier (and, for the most part, more conductive) particles in the method of the invention, even lesser quantities of particles will be necessary to achieve interesting conductivity and/or electromagnetic shielding levels.

The composite produced by the method of the invention are electrically conductive. Also, they can be used for electromagnetic shielding. Also, the level of shielding of the produced materials can be easily increased when carrying optional step d) above, in which several composites are fused together.

Definitions

The use of the terms “a” and “an” and “the” and similar referents in the context of describing the invention (especially in the context of the following claims) are to be construed to cover both the singular and the plural, unless otherwise indicated herein or clearly contradicted by context.

The terms “comprising”, “having”, “including”, and “containing” are to be construed as open-ended terms (i.e., meaning “including, but not limited to”) unless otherwise noted. In contrast, the phrase “consisting of” excludes any unspecified element, step, ingredient, or the like. The phrase “consisting essentially of” limits the scope to the specified materials or steps and those that do not materially affect the basic and novel characteristic(s) of the invention.

Recitation of ranges of values herein are merely intended to serve as a shorthand method of referring individually to each separate value falling within the range, unless otherwise indicated herein, and each separate value is incorporated into the specification as if it were individually recited herein. All subsets of values within the ranges are also incorporated into the specification as if they were individually recited herein.

All methods described herein can be performed in any suitable order unless otherwise indicated herein or otherwise clearly contradicted by context.

The use of any and all examples, or exemplary language (e.g., “such as”) provided herein, is intended merely to better illuminate the invention and does not pose a limitation on the scope of the invention unless otherwise claimed.

No language in the specification should be construed as indicating any non-claimed element as essential to the practice of the invention.

Herein, the term “about” has its ordinary meaning. In embodiments, it may mean plus or minus 10% or plus or minus 5% of the numerical value qualified.

Unless otherwise defined, all technical and scientific terms used herein have the same meaning as commonly understood by one of ordinary skill in the art to which this invention belongs.

Other objects, advantages and features of the present invention will become more apparent upon reading of the following non-restrictive description of specific embodiments thereof, given by way of example only with reference to the accompanying drawings.

DESCRIPTION OF ILLUSTRATIVE EMBODIMENTS

The present invention is illustrated in further details by the following non-limiting examples.

Examples

Films were produced using the method of the invention. Then, the electrical conductivity and the electromagnetic shielding effectiveness were measured and compared to those of composite films of the literature.

To produce films according to the method of the invention (Examples 1-9), Shrinky Dinks® shrinkable polystyrene sheets (Shrinky Dinks, USA) were used. These sheets were sanded manually using sandpaper and then dusted with a brush. Then, the surface of the polystyrene sheet was colored using a 8B, 7B, 9B, or HB pencil. As a result, the surface of the sheet was covered with a thin layer of graphite left by the pencil. Then, the sheet was wrapped in baking paper to avoid sticking and, as per the manufacturer’s instructions, placed in an oven at 160° C. for 3 minutes to shrink the film. The resulting shrunken film was one third of its original size.

In the case when several films were stacked together. The films were placed on the top of one another and maintained in place with a weight to keep them glued together. Further, they were heated to the temperature of 160° C. for 3 minutes.

Each single shrunken polystyrene film was approximately 1 to 1.5 mm thick. Superposed films comprising two such films where twice that thickness, and so on for each additional film. The graphite incorporated in the polystyrene films reached a depth corresponding to approximately 10-20% of the total thickness of the sample.

The electrical conductivity and electromagnetic shielding tests were conducted as follows.

The direct current (DC) electrical conductivity of the samples was determined by the four-probe method at room temperature in the manner described in Heaney, M. B. (1999). The Measurement, Instrumentation and Sensors Handbook, CRC Press. A current source was used to apply current on opposite edges of the shrunken film and an electrometer was used to measure the difference of potential. Measurements were repeated five times, and the average DC electrical conductivity values were registered.

The electromagnetic shielding effectiveness (EMI-SE) measurements were performed using a network analyzer in the X-band microwave frequency range (8.2-12.4 GHz). EMI-SE measurements were carried out with an X-band waveguide as the sample holder and the thickness of the samples varied between 1 and 5 mm.

The results are reported in the table below. Results reported in the literature are also provided in the table for comparison (Comparative Examples 10-22).

As can be seen in the table below, using the method of the invention, materials exhibiting an electrical conductivity varying from 5 to 32 S/m were prepared by adding to a polystyrene matrix only 0.8-2 wt % of graphite (Examples 1-9). The results of the literature (Examples 10-22) show that when using conventional polymer processing methods, it is necessary to add larger quantities of nanoparticles to achieve good conductivities.

Further, using the method of the invention (Examples 1-9), materials exhibiting an electromagnetic shielding efficiency of 28.73 dB were obtained using only about 2 wt % of graphite. This level of shielding is normally obtained using more than 30 wt % of conductive particles in a matrix.

Finally, it should be noted that, in many of Examples 10-22, the nanoparticles used were much more expensive (and often more conductive) than graphite used in the method of the invention.

The scope of the claims should not be limited by the preferred embodiments set forth in the examples but should be given the broadest interpretation consistent with the description as a whole.

| Example | Method used | Polymer | Conductive particles & concentration | Electrical conductivity (S/m) | Film thick-ness (mm) | EMISE (dB) | Electro-magnetic frequency (GHz) |
|---|---|---|---|---|---|---|---|
| 1 | None | Polystyrene | None | 1E−14 | | 0.11 | 8.2-12.4 |
| 2 | Method of the invention, one film, graphite applied to a single side of the film | Polystyrene | Graphite from 8B pencil (0.8 wt %) | 3.20E+01 | ≈1 | 9.18 | 8.2-12.4 |
| 3 | Method of the invention, two films superposed together, graphite applied to a single side of the films | Polystyrene | Graphite from 8B pencil | — | ≈2 | 13.27 | 8.2-12.4 |
| 4 | Method of the invention, one film, graphite applied to both sides of the film | Polystyrene | Graphite from 8B pencil | — | ≈1 | 12.29 | 8.2-12.4 |
| 5 | Method of the invention, three films superposed together, graphite applied to a single side of the films | Polystyrene | Graphite from 8B pencil | — | ≈3 | 18.42 | 8.2-12.4 |
| 6 | Method of the invention, three films superposed together, graphite applied to both sides of the films | Polystyrene | Graphite from 8B pencil (less than 2 wt %) | — | ≈3 | 28.73 | 8.2-12.4 |
| 7 | Method of the invention, one film, graphite applied to a single side of the film | Polystyrene | Graphite from 7B pencil | 2.97E+01 | ≈1 | — | — |
| 8 | Method of the invention, one film, graphite applied to a single side of the film | Polystyrene | Graphite from 9B pencil | 1.56E+01 | ≈1 | — | — |
| 9 | Method of the invention, one film, graphite applied to a single side of the film | Polystyrene | Graphite from HB pencil | 4.87E+00 | ≈1 | — | — |
| 10 (comparative) | Method of reference 20: tumble mixer + compression molding | High density polyethylene | Graphite (30 mol %) | — | 3 | ≈33 | 8.2-12.4 |
| 11 (comparative) | Method of reference 21: mixer (melt) + compression molding | Polypropylene | Graphite (60 wt %) | ≈18 | 4.96 | ≈18 | 8.2-12.4 |
| 12 (comparative) | Method of reference 21: Mixer (melt) + compression molding | Poly(ether imide) | Graphite (30 wt %) | ≈33 | 4.96 | ≈20 | 8.2-12.4 |
| 13 (comparative) | Method of reference 22: Internal mixer | Polystyrene | Carbon black (10 wt %) | 10.87 | 2 | 13.6 | 1 GHz |
| 14 (comparative) | Method of reference 23: Ultrasonic dispersion + Spraying | Polystyrene | Carbon fibers (20 wt %) | — | 1 | ≈20 | 8.2-12.4 |
| 15 (comparative) | Method of reference 24: Mixture in solution + Spraying + Compression molding | Polystyrene foam | Carbon nanofibers (20 wt %) | — | — | 20.51 | 8-12 |
| 16 (comparative) | Method of reference 23: Ultrasonic dispersion + Spraying | Polystyrene | Carbon nanotubes (7 wt %) | 0.5 | 1 | ≈26 | 8.2-12.4 |
| 17 (comparative) | Method of reference 25: Double screw extrusion + Compression molding | Polystyrene | Multi-walled carbon nanotubes (10 wt %) | ≈10 | 2 | ≈35 | 8-12 |
| 18 (comparative) | Method of reference 25: Double screw extrusion + Injection molding | Polystyrene | Multi-walled carbon nanotubes (10 wt %) | 1E−02 | 2 | ≈23 | 8-12 |
| 19 (comparative) | Method of reference 24: Mixture in solution + Spraying + Compression molding | Polystyrene foam | Multi-walled carbon nanotubes (7 wt %) | — | — | 18.56 | 8-12 |
| 20 (comparative) | Method of reference 26: Mixture in solution | Polystyrene | Multi-walled carbon nanotubes (10 vol %) | 90 | — | 17 | 8-12 |
| 21 (comparative) | Method of reference 13: Mixture in solution + High pressure compression molding | Polystyrene | Chemically modified graphene sheets (30 wt %) | 1.25 | 2.5 | 29.3 | 8.2-12.4 |
| 22 (comparative) | Method of reference 13: Mixture in solution + High pressure compression molding | Polystyrene | Chemically modified graphene sheets (30 wt %) | 0.22 | 2.5 | 17.3 | 8.2-12.4 |

REFERENCES

The present description refers to a number of documents, the content of which is herein incorporated by reference in their entirety. These documents include, but are not limited to, the following:

1. Thomassin, J.-M., et al., Polymer/carbon based composites as electromagnetic interference (EMI) shielding materials. Materials Science and Engineering: R: Reports, 2013. 74(7): p. 211-232.
2. Chen, H., et al., Thermal conductivity of polymer-based composites: Fundamentals and applications. Progress in Polymer Science, 2016. 59: p. 41-85.

3. Chung, D. D. L., Carbon materials for structural self-sensing, electromagnetic shielding and thermal interfacing. Carbon, 2012. 50(9): p. 3342-3353.
4. Gao, Y., Graphene and Polymer Composites for Supercapacitor Applications: a Review. Nanoscale Research Letters, 2017. 12(1): p. 387.
5. Pande, S., et al., Mechanical and electrical properties of multiwall carbon nanotube/polycarbonate composites for electrostatic discharge and electromagnetic interference shielding applications. RSC Advances, 2014. 4(27): p. 13839-13849.
6. Chung, D. D. L., Electromagnetic interference shielding effectiveness of carbon materials. Carbon, 2001. 39(2): p. 279-285.
7. Tong, X. C., Advanced Materials and Design for Electromagnetoc Interference Shielding. 2009: CRC Press.
8. EMI/RFI: Materials and Technologies. 2016 [cited 2017 Aug. 9th]; Electronics Industry Market Research and Knowledge Network—Electronics.ca Publications]. Available from: https://www.electronics.ca/store/emi-rf-shielding-technologies-and-markets.html.
9. Alig, I., et al., Establishment, morphology and properties of carbon nanotube networks in polymer melts. Polymer, 2012. 53(1): p. 4-28.
10. Emplit, A., et al., Polypropylene Carbon Nanotubes Nanocomposites: Combined Influence of Block Copolymer Compatibilizer and Melt Annealing on Electrical Properties. Journal of Nanomaterials, 2017. 2017: p. 11.
11. Choudhary, V. and A. Gupta, Polymer/Carbon Nanotube Nanocomposites. Carbon Nanotubes—Polymer Nanocomposites. 2011: InTech. 396.
12. Kuester, S., G. M. Barra, and N. R. Demarquette, Morphology, mechanical properties and electromagnetic shielding effectiveness of poly(styrene-b-ethylene-ran-butylene-b-styrene)/carbon nanotube nanocomposites: effects of maleic anhydride, carbon nanotube loading and processing method. Polymer International, 2018. 67(9): p. 1229-1240.
13. Yan, D.-X., et al., Efficient electromagnetic interference shielding of lightweight graphene/polystyrene composite. Journal of Materials Chemistry, 2012. 22(36): p. 18772-18774.
14. Bhattacharyya, A. R., et al., Melt Mixing as Method to Disperse Carbon Nanotubes into Thermoplastic Polymers AU—Pötschke, Petra. Fullerenes, Nanotubes and Carbon Nanostructures, 2005. 13(sup1): p. 211-224.
15. Stoeffler, K., et al., Polyamide 12 (PA12)/clay nanocomposites fabricated by conventional extrusion and water-assisted extrusion processes. Journal of Applied Polymer Science, 2013. 130(3): p. 1959-1974.
16. Kuester, S., et al., Processing and characterization of conductive composites based on poly(styrene-b-ethylene-ran-butylene-b-styrene) (SEBS) and carbon additives: A comparative study of expanded graphite and carbon black. Composites Part B: Engineering, 2015. 84: p. 236-247.
17. Kuester, S., et al., Electromagnetic interference shielding and electrical properties of nanocomposites based on poly (styrene-b-ethylene-ran-butylene-b-styrene) and carbon nanotubes. European Polymer Journal, 2016. 77: p. 43-53.
18. Helal, E., et al., Styrenic block copolymer-based nanocomposites: Implications of nanostructuration and nanofiller tailored dispersion on the dielectric properties. Polymer, 2015. 64: p. 139-152.
19. Kurusu, R. S., et al., The Role of Selectively Located Commercial Graphene Nanoplatelets in the Electrical Properties, Morphology, and Stability of EVA/LLDPE Blends. Macromolecular Materials and Engineering, 2018. 303(9): p. 1800187.
20. Panwar, V. and R. M. Mehra, Analysis of electrical, dielectric, and electromagnetic interference shielding behavior of graphite filled high density polyethylene composites. Polymer Engineering & Science, 2008. 48(11): p. 2178-2187.
21. Sawai, P. and S. Banerjee, Electromagnetic interference shielding effectiveness of graphite-filled polypropylene and poly(ether imide) based composites. Journal of Applied Polymer Science, 2008. 109(3): p. 2054-2063.
22. AI-Saleh, M. H. and U. Sundararaj, Electromagnetic Interference (EMI) Shielding Effectiveness of PP/PS Polymer Blends Containing High Structure Carbon Black. Macromolecular Materials and Engineering, 2008. 293 (9): p. 789-789.
23. Yang, Y., et al., A Comparative Study of EMI Shielding Properties of Carbon Nanofiber and Multi-Walled Carbon Nanotube Filled Polymer Composites. Journal of Nanoscience and Nanotechnology, 2005. 5(6): p. 927-931.
24. Yang, Y., et al., Novel Carbon Nanotube-Polystyrene Foam Composites for Electromagnetic Interference Shielding. Nano Letters, 2005. 5(11): p. 2131-2134.
25. Arjmand, M., et al., Comparative study of electromagnetic interference shielding properties of injection molded versus compression molded multi-walled carbon nanotube/polystyrene composites. Carbon, 2012. 50(14): p. 5126-5134.
26. Mathur, R. B., et al., Electrical and mechanical properties of multi-walled carbon nanotubes reinforced PMMA and PS composites. Polymer Composites, 2008. 29(7): p. 717-727.
27. Heaney, M. B. (1999). The Measurement, Instrumentation and Sensors Handbook, CRC Press
28. Greco, F., Fujie, T., Taccola, S., Ricotti, L., Menciassi, A., & Mattoli, V. (2012). Micro and Nanowrinkled Conductive Polymer Surfaces on Shape-memory Polymer Substrates: Tuning of Surface Microfeatures Towards Smart Biointerfaces. MRS Proceedings, 1411, Mrsf11-1411-ee09-21. doi:10.1557/opl.2012.474.
29. Guillaume Pillet, Pascal Puech, Sébastien Moyano, Frédéric Neumayer, Wolfgang Bacsa, Embedded carbon nanotubes on surface of thermoplastic poly(ether ether ketone), Polymer, Volume 226, 2021, 123807, ISSN 0032-3861, https://doi.org/10.1016/j.polymer.2021.123807.

| | | |
|---|---|---|
| BR102012007746A | CN103060779A | CN103762457A |
| CN104151833A | CN104448837A | CN104558777A |
| CN106413367A | CN106810875A | CN106832522A |
| CN107236302A | CN107415420A | CN107742560A |
| CN109251402A | CN109370078A | CN1900162A |
| DE3034747A1 | JP2002322388A | JP63280603A |
| MX2013006078A | US 2002/0037376 | US 2013/130049 |
| US 2015/044383 | US 2015/057386 | US 2015/267030 |
| U.S. Pat. No. 2,027,962 | U.S. Pat. No. 3,086,242 | U.S. Pat. No. 3,576,387 |

-continued

| | | |
|---|---|---|
| U.S. Pat. No. 4,542,076 | U.S. Pat. No. 4,265,789 | U.S. Pat. No. 6,127,474 |
| U.S. Pat. No. 6,881,904 | U.S. Pat. No. 8,691,393 | U.S. Pat. No. 9,111,658 |
| WO 2007/096479 A1 | WO 2013/011250 A1 | U.S. Pat. No. 10,721,815 B2 |
| U.S. Pat. No. 4,764,422 A | US 2012/0320558 A1 | WO 2017/185186 A1 |

The invention claimed is:

1. A method of manufacturing an electrically conductive composite comprising a thermoplastic polymer and electrically conductive particles embedded in at least part of the surface of the thermoplastic polymer, the method comprising the steps of:

a) providing a heat-shrinkable object made of bulk thermoplastic polymer, wherein at least part of the surface of the object is rough having pits and/or grooves, b) depositing electrically conductive particles on said part of the surface of the object that is rough so that the electrically conductive particles come to rest in said pits and/or groove, leaving spaces free of electrically conductive particles on said part of the surface of the object that is rough, and c) heating the object above a shrinking temperature, thereby shrinking the object, at least partially closing the pits and/or grooves to embedding the electrically conductive particles into said part of the surface of the object that is rough and allowing the electrically conductive particles to form conductive paths yielding the electrically conductive composite wherein step a) comprises:

0. hot extrusion of a thermoplastic polymer into a thermoplastic polymer object, i. applying stress on the thermoplastic polymer object while the thermoplastic polymer object is still hot to stretch the thermoplastic polymer object and ii. cooling the thermoplastic polymer object while the thermoplastic polymer object still under stress, thereby producing the heat-shrinkable object, and wherein step b) comprises rubbing an exfoliate-able object made of a conducting material on said part of the surface of the heat-shrinkable object that is rough, thereby depositing the electrically conductive particles thereon or wherein, in step b), wherein the electrically conductive particles in loose powder form are placed on said part of the surface of the heat-shrinkable object that is rough.

2. The method of claim 1, wherein the heat-shrinkable object is made of an oriented amorphous or crystalline thermoplastic.

3. The method of claim 1, wherein the heat-shrinkable object is shaped as a film.

4. The method of claim 3, wherein the film is between about 100 μm and about 500 μm in thickness.

5. The method of claim 1, wherein the heat-shrinkable object is a shrinkable polystyrene sheet.

6. The method of claim 1, wherein the thermoplastic polymer object is heated at a temperature above the glass transition temperature of the thermoplastic polymer in step i.

7. The method of claim 1, wherein the thermoplastic polymer object is cooled at a temperature below the glass transition temperature of the thermoplastic polymer in step ii.

8. The method of claim 1, wherein the shrinking temperature is at or above the glass transition temperature of the thermoplastic polymer.

9. The method of claim 1, wherein step a) comprises sanding part of the surface of the heat-shrinkable object, so that said part of the surface is rough.

10. The method of claim 1, wherein the electrically conductive particles are particles of silver, copper, nickel, zinc, cobalt, tin, lead, platinum, gold, or an alloy or a mixture thereof, or particles of a carbon allotrope.

11. The method of claim 1, wherein the electrically conductive particles are nanoparticles between about 1 and about 1000 nm in size or microparticles between about 1 and 1000 μm in size.

12. The method of claim 1, wherein, in step b), the electrically conductive particles are deposited randomly on said part of the surface of the object that is rough.

13. The method of claim 1, wherein step b) comprises rubbing an exfoliate-able object made of a conducting material on said part of the surface of the heat-shrinkable object that is rough, thereby depositing the electrically conductive particles thereon.

14. The method of claim 1, wherein step b) comprises rubbing an exfoliate-able object, over said part of the surface of the heat-shrinkable object that is rough, thereby exfoliating and depositing graphite onto the surface.

15. The method of claim 1, wherein, in step b), wherein the electrically conductive particles in loose powder form are placed on said part of the surface of the heat-shrinkable object that is rough.

16. The method of claim 15, wherein, in step b), wherein the electrically conductive particles are rubbed on said part of the surface of the heat-shrinkable object that is rough.

17. The method of claim 1, further comprising the step d) of stacking on top of one another two or more electrically conductive composites produced according to steps a) to c), applying pressure on the stack of electrically conductive composites, and heating the stack of electrically conductive composites under pressure to fuse the two or more electrically conductive composites together.

18. An electrically conductive composite produced according to method of claim 1.

* * * * *